US012190856B2

(12) United States Patent
Fukui et al.

(10) Patent No.: US 12,190,856 B2
(45) Date of Patent: Jan. 7, 2025

(54) SOUND SYSTEM

(71) Applicant: NIPPON TELEGRAPH AND TELEPHONE CORPORATION, Tokyo (JP)

(72) Inventors: Masahiro Fukui, Tokyo (JP); Kazunori Kobayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 277 days.

(21) Appl. No.: 17/914,378

(22) PCT Filed: Mar. 30, 2020

(86) PCT No.: PCT/JP2020/014471
§ 371 (c)(1),
(2) Date: Sep. 26, 2022

(87) PCT Pub. No.: WO2021/199115
PCT Pub. Date: Oct. 7, 2021

(65) Prior Publication Data

US 2023/0139520 A1 May 4, 2023

(51) Int. Cl.
*G10K 11/178* (2006.01)
*H04R 1/02* (2006.01)
*H04R 1/10* (2006.01)

(52) U.S. Cl.
CPC ....... *G10K 11/17881* (2018.01); *H04R 1/025* (2013.01); *H04R 1/1083* (2013.01); *G10K 2210/1281* (2013.01)

(58) Field of Classification Search
CPC ..... G10K 11/17881; G10K 2210/1281; H04R 1/025; H04R 1/1083
See application file for complete search history.

(56) References Cited

U.S. PATENT DOCUMENTS 7,440,578 B2 * 10/2008 Arai ..................... G10K 11/161 381/310
9,860,643 B1 1/2018 Oswald
(Continued)

FOREIGN PATENT DOCUMENTS

JP 2008271067 A 11/2008
JP 2019536107 A 12/2019

OTHER PUBLICATIONS

Inflight Entertainment / JAL First Class, [online], [retrieved on Mar. 16, 2020], Internet <URL: https://www.jal.co.jp/jp/ia/inter/service/first/entertainment/index.html> with English version.
(Continued)

*Primary Examiner* — David L Ton

(57) ABSTRACT

A technology is provided that reduces noise heard when a user sits in a seat of an aircraft, without using earphones or headphones. A sound system includes: a control system that generates a control signal for canceling noise in a place close to a head of a user using a seat of an aircraft, from a signal of the noise (noise signal); and a noise-cancellation speaker system including speaker units that emit sound based on the control signal (first noise-cancellation speaker unit, . . . , M-th noise-cancellation speaker unit), the noise-cancellation speaker system being installed at the place close to the head of the user using the seat, wherein assuming that a direction in which the m-th noise-cancellation speaker unit faces the user is an m-th noise-cancellation user direction, the m-th noise-cancellation speaker unit is disposed such that sound emitted from the m-th noise-cancellation speaker unit in the m-th noise-cancellation user direction is canceled in a place other than the place close to the head of the user using the seat, due to bending around of sound emitted from the m-th noise-cancellation speaker unit in an opposite direction to the m-th noise-cancellation user direction.

4 Claims, 19 Drawing Sheets

(56) References Cited

U.S. PATENT DOCUMENTS

| | | | | |
|---|---|---|---|---|
| 10,293,728 | B2 * | 5/2019 | Oswald | B60N 2/879 |
| 2008/0260174 | A1 | 10/2008 | Yokota | |
| 2013/0243225 | A1 | 9/2013 | Yokota | |
| 2016/0027428 | A1 * | 1/2016 | Gul | G10K 11/17833 381/71.4 |

OTHER PUBLICATIONS

ANC noise reduction testing system, [online], [retrieved on Mar. 16, 2020], Internet <URL: https://micronet.jp/product/anc/index.html> with English translation generated by computer.

Active Noise Control (The Institute of Electronics, Information and Communication Engineers "Forest of Knowledge", Group 2—Section 6—Chapter 6), [online], [retrieved on Mar. 16, 2020], Internet <URL: http://www.ieice-hbkb.org/files/02/02gun_06hen_06.pdf> with English translation generated by computer.

* cited by examiner

SOUND SYSTEM

SOUND SYSTEM

CROSS-REFERENCE TO RELATED APPLICATIONS

This application is a U.S. National Stage Application filed under 35 U.S.C. § 371 claiming priority to International Patent Application No. PCT/JP2020/014471, filed on 30 Mar. 2020, the disclosure of which is hereby incorporated herein by reference in its entirety.

TECHNICAL FIELD

The present invention relates to a technology for reducing noise in an aircraft.

BACKGROUND ART

Conventionally, when users are annoyed with noise while viewing a movie, listening to music, or the like in an aircraft, the users have used earphones or headphones including a noise canceling function (see Non-Patent Literature 1).

CITATION LIST

Non-Patent Literature

Non-Patent Literature 1: Inflight Entertainment/JAL First Class, [online], [retrieved on Mar. 16, 2020], Internet <URL: https://www.jal.co.jp/jp/ja/inter/service/first/entertain ment/index.html>

SUMMARY OF THE INVENTION

Technical Problem

However, wearing earphones or headphones makes users uncomfortable. Moreover, some users do not like wearing such devices because hairstyles become untidy. There are also some users who dislike pressure on ears caused by wearing the devices. Further, a long period of wearing earphones or headphones may make users tired of hearing in some cases.

Accordingly, an object of the present invention is to provide a technology that reduces noise heard when a user sits in a seat of an aircraft, without using earphones or headphones.

Means for Solving the Problem

An aspect of the present invention includes: a control system that generates a control signal for canceling noise in a place close to a head of a user using a seat of an aircraft, from a signal of the noise (hereinafter, referred to as the noise signal); and a noise-cancellation speaker system including M speaker units that emit sound based on the control signal (hereinafter, referred to as the noise-cancellation speaker units), M being an integer equal to or larger than one, the noise-cancellation speaker system being installed at the place close to the head of the user using the seat, wherein assuming that the M noise-cancellation speaker units are a first noise-cancellation speaker unit, . . . , and an M-th noise-cancellation speaker unit, and assuming that a direction in which the m-th noise-cancellation speaker unit faces the user is an m-th noise-cancellation user direction (m=1, . . . , M), the m-th noise-cancellation speaker unit (m=1, . . . , M) is disposed such that sound emitted from the m-th noise-cancellation speaker unit in the m-th noise-cancellation user direction is canceled in a place other than the place close to the head of the user using the seat, due to bending around of sound emitted from the m-th noise-cancellation speaker unit in an opposite direction to the m-th noise-cancellation user direction.

Effects of the Invention

According to the present invention, it is possible to reduce noise heard when a user sits in a seat of an aircraft.

DESCRIPTION OF EMBODIMENTS

Hereinafter, embodiments of the present invention will be described in detail. Note that components having the same functions are denoted by the same reference signs, and an overlapping description is omitted.

TECHNICAL BACKGROUND

Active noise control, which is one of noise reduction technologies, is used to reduce noise heard when a user sits in a seat of an aircraft (see Reference Non-Patent Literatures 1, 2).

(Reference Non-Patent Literature 1: ANC noise reduction testing system, [online], [retrieved on Mar. 16, 2020], Internet <URL: https://micronet.jp/product/anc/index.html>)

(Reference Non-Patent Literature 2: Active Noise Control (The Institute of Electronics, Information and Communication Engineers "Chishiki-no-Mori", Group 2-Edition 6—Chapter 6), [online], [retrieved on Mar. 16, 2020], Internet <URL: http://www.ieice-hbkb.org/files/02/02gun_06hen_06.pdf>)

Figure 1:
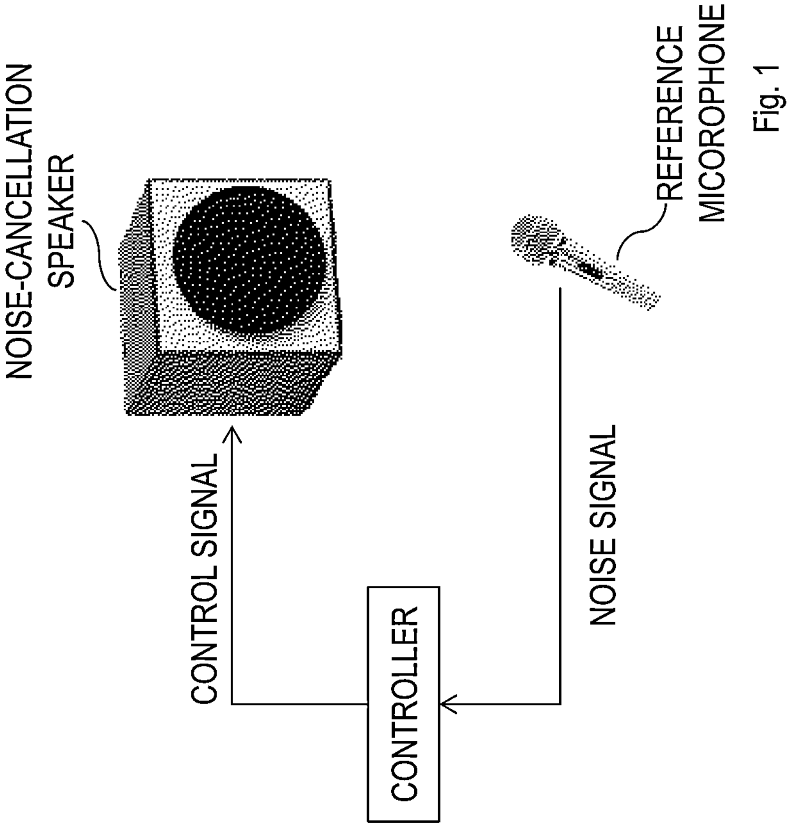
FIG. 1 shows an example of a configuration of an active noise control system.

FIG. 1 shows an example of a configuration of an active noise control system. The active noise control system includes a microphone that picks up noise (hereinafter, referred to as reference microphone), a controller that generates, from a signal outputted from the reference microphone (hereinafter, referred to as noise signal), a control signal for canceling the noise, and a noise-cancellation speaker for emitting sound based on the control signal. Note that the active noise control system may further include a microphone that picks up sound that cannot be canceled out (hereinafter, referred to as error microphone), and may be configured such that a signal outputted from the error microphone (hereinafter, referred to as error signal) is fed back to the controller and the controller generates a control signal by using also the error signal.

Main components of noise in an aircraft concentrate at low frequencies. Accordingly, unless the noise-cancellation speaker has a correspondingly large size, low-frequency sound cannot sufficiently be reproduced, so that a satisfactory noise reduction effect cannot be obtained. However, the larger the noise-cancellation speaker is in size, the more difficult it is to use the noise-cancellation speaker in a seat of an aircraft. Moreover, if sound from the noise-cancellation speaker is picked up by the reference microphone, a problem arises that a signal of the sound from the noise-cancellation speaker is included in a noise signal, resulting in noise reduction performance being degraded.

Figure 2:
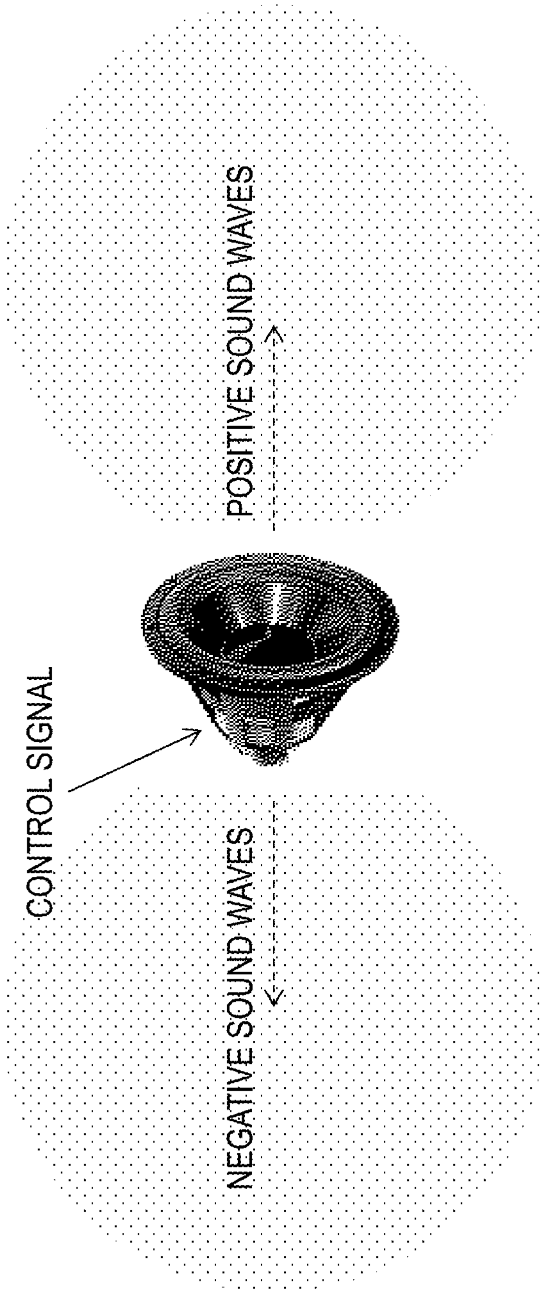
FIG. 2 is a view for describing directivity of sound emitted from a speaker unit.

To solve these two problems, the invention of the present application uses a speaker unit instead of using a speaker, to emit sound based on a control signal (see FIG. 2).

Generally, a speaker includes a speaker unit and a speaker box. The speaker unit is a component including a diaphragm that converts a sound signal, which is an electrical signal, into aerial vibration (that is, generates sound waves). The speaker box is a component that houses the speaker unit.

When a sound signal is inputted into the speaker, the diaphragm of the speaker unit vibrates, and sound waves are emitted in both directions in which the diaphragm vibrates. Here, a sound wave emitted to the outside of the speaker box (that is, in a direction toward the front of the speaker unit) is referred to as positive sound wave, and a sound wave emitted to the inside of the speaker box (that is, in a direction toward the rear of the speaker unit) is referred to as negative sound wave. The negative sound wave is a sound wave with opposite phase to phase of the positive sound wave. When the speaker is used, while positive sound waves are emitted from the speaker in all directions, negative sound waves do not go out of the speaker box. In contrast, when only the speaker unit is used, negative sound waves are also emitted because there is no speaker box. In the latter case, since the positive sound waves and the negative sound waves have an antiphase relationship, the positive sound waves and the negative sound waves cancel each other out. However, in the vicinity of the speaker unit, positive sound waves remain because negative sound waves that bend around do not reach in time. If the remaining positive sound waves and noise have an antiphase relationship, the positive sound waves cancel the noise out, whereby a noise reduction effect can be obtained in the vicinity of the speaker unit.

In other words, if the speaker unit is installed in a form without using the speaker box at a place close to an ear of a user, noise reduction in an aircraft can be achieved. Moreover, since an area where the positive sound waves remain is limited to a relatively small area such as the vicinity of the speaker unit, bending around of sound to the reference microphone is restrained, and degradation in noise reduction performance can also be restrained.

The form in which only the speaker unit is installed has a merit that an installation space can be minimized because no speaker box is used. Moreover, in addition to such a merit, the form in which only the speaker unit is installed also has a merit that lower-frequency sound can be reproduced than in a form in which the speaker unit is installed in combination with the speaker box. The reason will be described below. Generally, when the speaker unit is housed in the speaker box, negative sound waves do not go out of the speaker box. However, when the speaker unit is housed in the speaker box, aerial vibration caused by the negative sound waves that are enclosed in the speaker box and cannot go anywhere constrains a cone of the speaker unit and hinders next vibration of the cone. As a result, low-frequency sound cannot be reproduced even if the speaker unit is housed in the speaker box. It is therefore conceivable that an inside of the speaker box is filled with a sound absorption member. However, such a method does not bring about a satisfactory effect with respect to low-frequency sound, so that the speaker box needs to be large in size to some extent in order to reproduce low-frequency sound. In other words, after all, use of the speaker box that is small enough to be installable in a seat in an aircraft cannot gain sound at sufficiently low frequencies.

First Embodiment

A system that reproduces a sound signal is referred to as a sound system. The sound system includes a speaker system in order to emit the sound signal as sound (hereinafter, such sound will be referred to as sound based on a sound signal). Here, the speaker system is a device that converts the sound signal, which is an analog signal, into sound. Moreover, the sound signal to be reproduced by the sound system is a sound signal obtained from, for example, data recorded on a CD, a DVD, or a record, data received over the Internet, or a signal received through radio broadcasting or television broadcasting.

Figure 3:
FIG. 3 shows an example of a sound system installed in a seat of an aircraft.

Hereinafter, a description will be given of a sound system that reduces noise around a user who is present in the vicinity of a speaker system by reproducing a control signal generated from a noise signal obtained from the noise. If such a sound system is utilized for, for example, a sound system for a user using a seat of an aircraft, a system that can reduce noise around the user using the seat can be provided. FIG. 3 shows an example of the sound system installed in a seat of an aircraft. The sound system in FIG. 3 is disposed such that a speaker system is positioned in the vicinity of a head of a user sitting in the seat. Note that such a sound system can also be installed on vehicles other than aircrafts, such as automobiles and trains, and in chairs used in houses and commercial facilities, and can also be installed in a wearable form to be put on a shoulder or the like. Moreover, a driver unit pair including two driver units arranged side by side, which corresponds to a pair of the above-mentioned speaker units, may be installed in each of right and left units of headphones or earphones.

Figure 4:
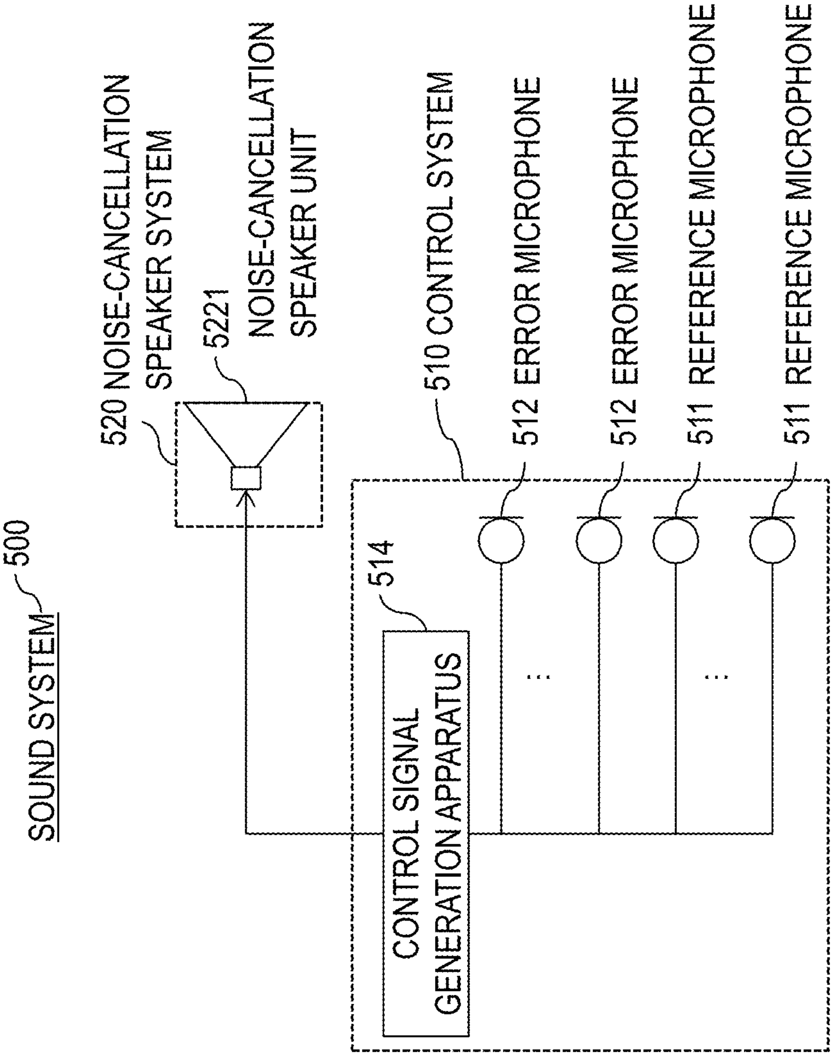
FIG. 4 is a block diagram showing an example of a configuration of a sound system 500.
Figure 5:
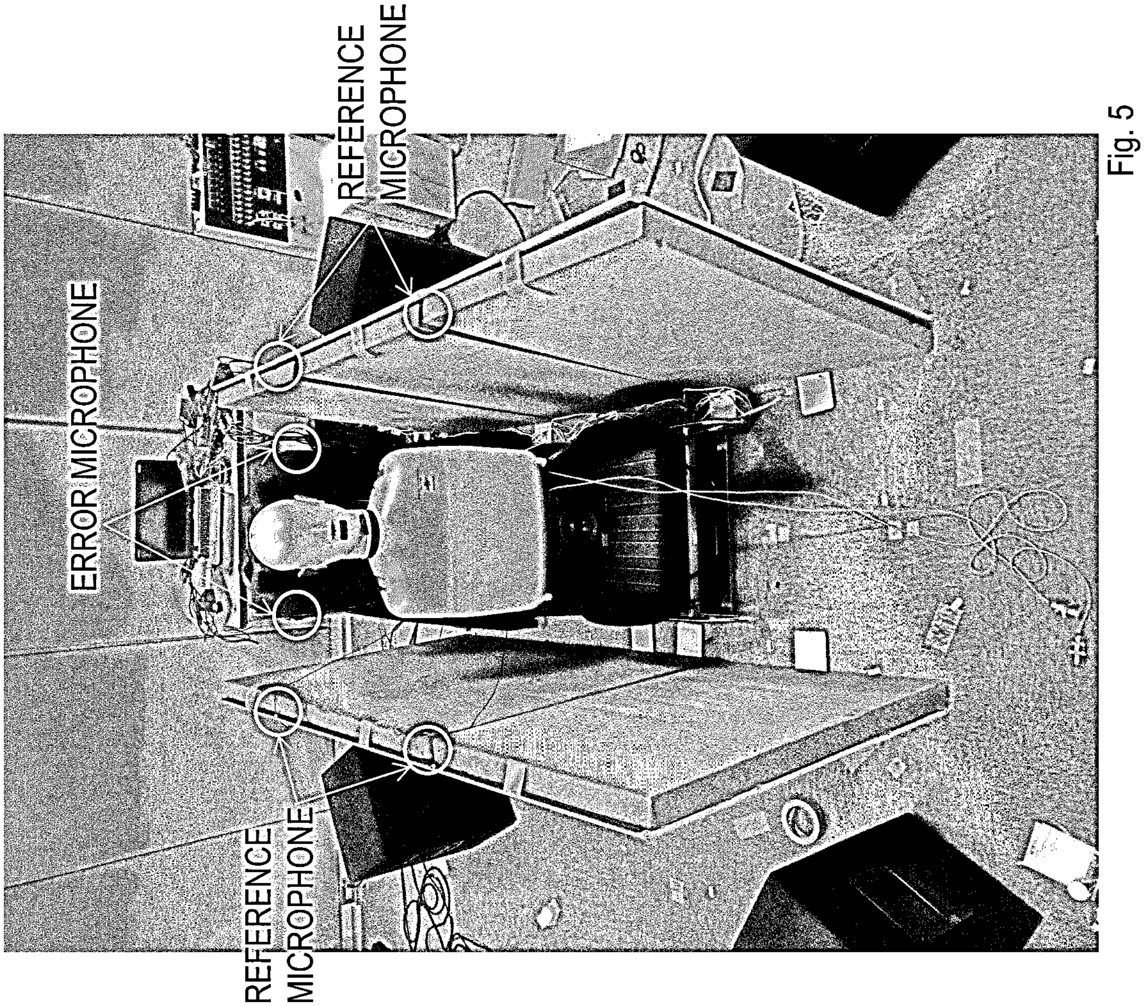
FIG. 5 shows an example of disposition of reference microphones and error microphones.

Hereinafter, a sound system 500 will be described with reference to FIG. 4. FIG. 4 is a block diagram showing a configuration of the sound system 500. As shown in FIG. 4, the sound system 500 includes a control system 510 and a noise-cancellation speaker system 520. The control system 510 includes K (K is an integer equal to or larger than one) reference microphones 511, L (L is an integer equal to or larger than zero) error microphones 512, and a control signal generation apparatus 514. Here, the reference microphones and the error microphones are, as described in the <Technical background> section, microphones that pick up noise, and microphones that pick up sound that cannot be canceled out, respectively. The error microphones are used for filter updating, and are used in many practical cases. Note that the minimum number of the microphones required for the sound system 500 is one (when K=1, L=0). FIG. 5 shows disposition of the reference microphones and the error microphones when K=4, L=2. It is preferable that the reference microphones be disposed at places where noise arrives earlier than the noise arrives at the error microphones, as seen in FIG. 5. Moreover, ideally, the error microphones had better be disposed at a position of an ear of a user, and it is therefore preferable that the error microphones be disposed at places as close to the ears as possible. The noise-cancellation speaker system 520 includes one noise-cancellation speaker unit 5221 that is a speaker unit emitting sound based on a control signal. The noise-cancellation speaker system 520 is installed at a place close to a head of the user using the seat.

Note that a direction in which the noise-cancellation speaker unit 5221 faces the user will be referred to as a noise-cancellation user direction. The noise-cancellation speaker unit 5221 is disposed such that sound emitted from the noise-cancellation speaker unit 5221 in the noise-cancellation user direction is canceled in places other than the place close to the head of the user using the seat, due to bending around of sound emitted from the noise-cancellation speaker unit 5221 in an opposite direction to the noise-cancellation user direction. Here, the noise-cancellation user direction is a direction toward the front of the noise-cancellation speaker unit 5221. Moreover, the opposite direction to the noise-cancellation user direction is a direction toward the rear of the noise-cancellation speaker unit 5221.

Hereinafter, operation of the sound system 500 will be described, according to FIG. 4.

The control system 510 generates a control signal for canceling noise in the place close to the head of the user using the seat of the aircraft, from a signal obtained from the noise (hereinafter, referred to as noise signal), and outputs the control signal. More specifically, the reference microphones 511 pick up noise in the place close to the head of the user using the seat of the aircraft, and outputs a noise signal that is obtained by converting the noise into an electrical signal. The error microphones 512 pick up sound that cannot be canceled out in a place extremely close to the head of the user, and outputs an error signal that is obtained by converting the sound that cannot be canceled out into an electrical signal. The control signal generation apparatus 514 receives the noise signal and the error signal as inputs, generates a control signal from the noise signal by using the error signal, and outputs the control signal. The control signal may be a signal with almost the same amplitude as and opposite phase to the noise signal.

The noise-cancellation speaker system 520 receives the control signal outputted by the control system 510 as an input, and emits sound based on the control signal. More specifically, the noise-cancellation speaker unit 5221 receives the control signal as an input, and emits sound based on the control signal.

According to the embodiment of the present invention, it is possible to reduce noise heard when a user sits in a seat of an aircraft.

Second Embodiment

The sound system 500 in the first embodiment uses only one noise-cancellation speaker unit, and an area where noise is reduced is therefore small. Here, a description will be given of a sound system including two or more noise-cancellation speaker units in order that the noise-cancellation speaker units can be installed at places respectively close to both ears of a user.

Figure 6:
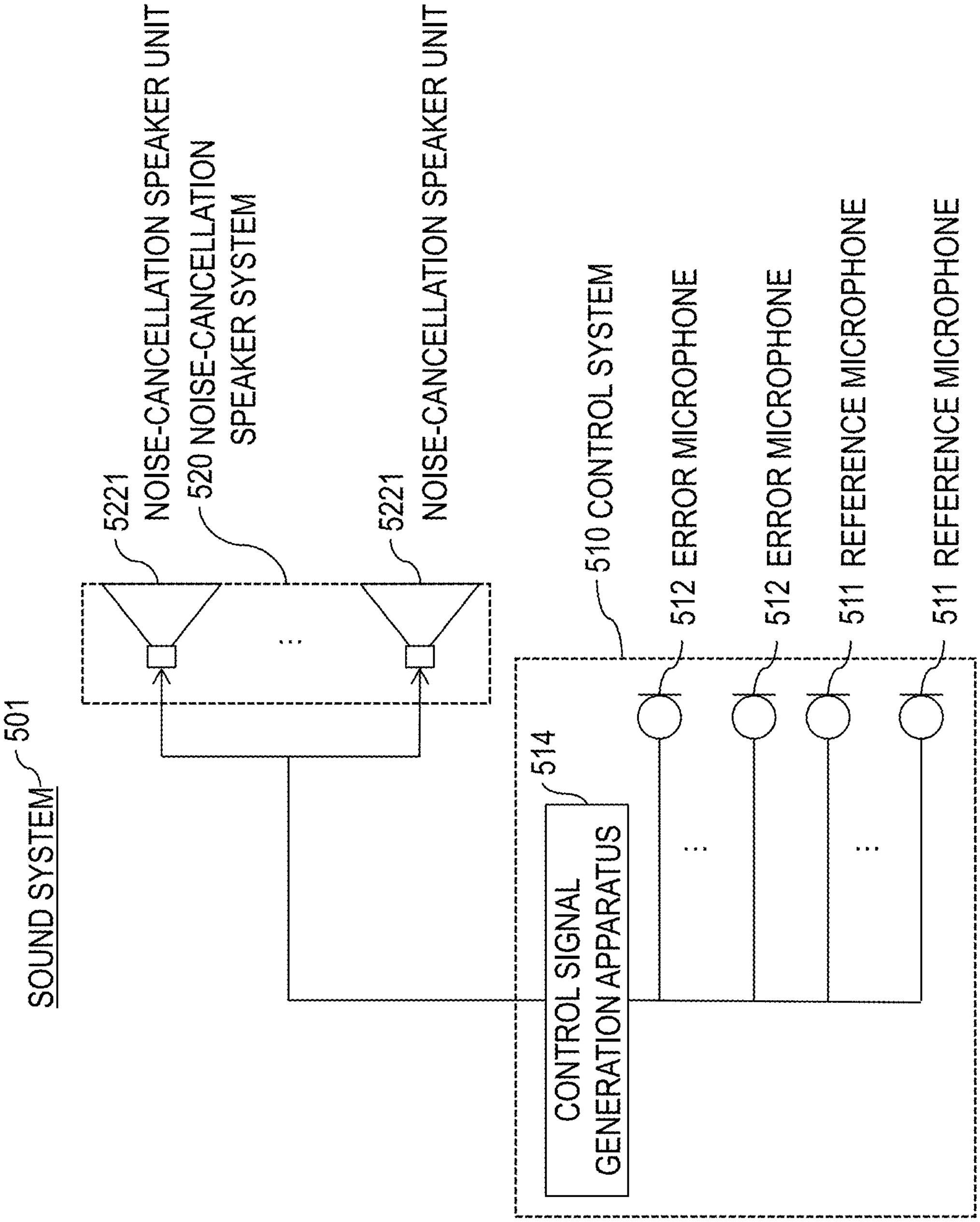
FIG. 6 is a block diagram showing an example of a configuration of a sound system 501.

Hereinafter, a sound system 501 will be described with reference to FIG. 6. FIG. 6 is a block diagram showing a configuration of the sound system 501. As shown in FIG. 6, the sound system 501 includes a control system 510 and a noise-cancellation speaker system 520, similarly to the sound system 500. However, the sound system 501 is different from the sound system 500 in a point that the noise-cancellation speaker system 520 includes M (M is an integer equal to or larger than two) noise-cancellation speaker units 5221. The M noise-cancellation speaker units 5221 receive the same control signal, as respective inputs.

Hereinafter, the M noise-cancellation speaker units will be referred to as first noise-cancellation speaker unit, . . . , and M-th noise-cancellation speaker unit. Moreover, a direction in which an m-th noise-cancellation speaker unit faces the user will be referred to as m-th noise-cancellation user direction (m=1, . . . , M), and the m-th noise-cancellation speaker unit (m=1, . . . , M) is disposed such that sound emitted from the m-th noise-cancellation speaker unit in the m-th noise-cancellation user direction is canceled in places other than a place closed to a head of the user using the seat, due to bending around of sound emitted from the m-th noise-cancellation speaker unit in an opposite direction to the m-th noise-cancellation user direction. Here, the m-th noise-cancellation user direction is a direction toward the front of the m-th noise-cancellation speaker unit 5221. The opposite direction to the m-th noise-cancellation user direction is a direction toward the rear of the m-th noise-cancellation speaker unit 5221.

Hereinafter, operation of the noise-cancellation speaker system 520 will be described, according to FIG. 6.

The noise-cancellation speaker system 520 receives a control signal outputted by the control system 510 as an input, and emits sound based on the control signal. More specifically, the m-th noise-cancellation speaker unit 5221 (m=1, . . . , M) receives the control signal as an input, and emits sound based on the control signal.

Note that although M is an integer equal to or larger than two here, the configuration corresponds to the first embodiment when M=1.

According to the embodiment of the present invention, it is possible to reduce noise heard when a user sits in a seat of an aircraft.

Third Embodiment

According to the sound system 501 in the second embodiment, the area where noise is reduced is enlarged by increasing the number of noise-cancellation speaker units. Here, a description will be given of a sound system having a structure that enlarges the area where noise is reduced, with one noise-cancellation speaker unit.

Figure 7:
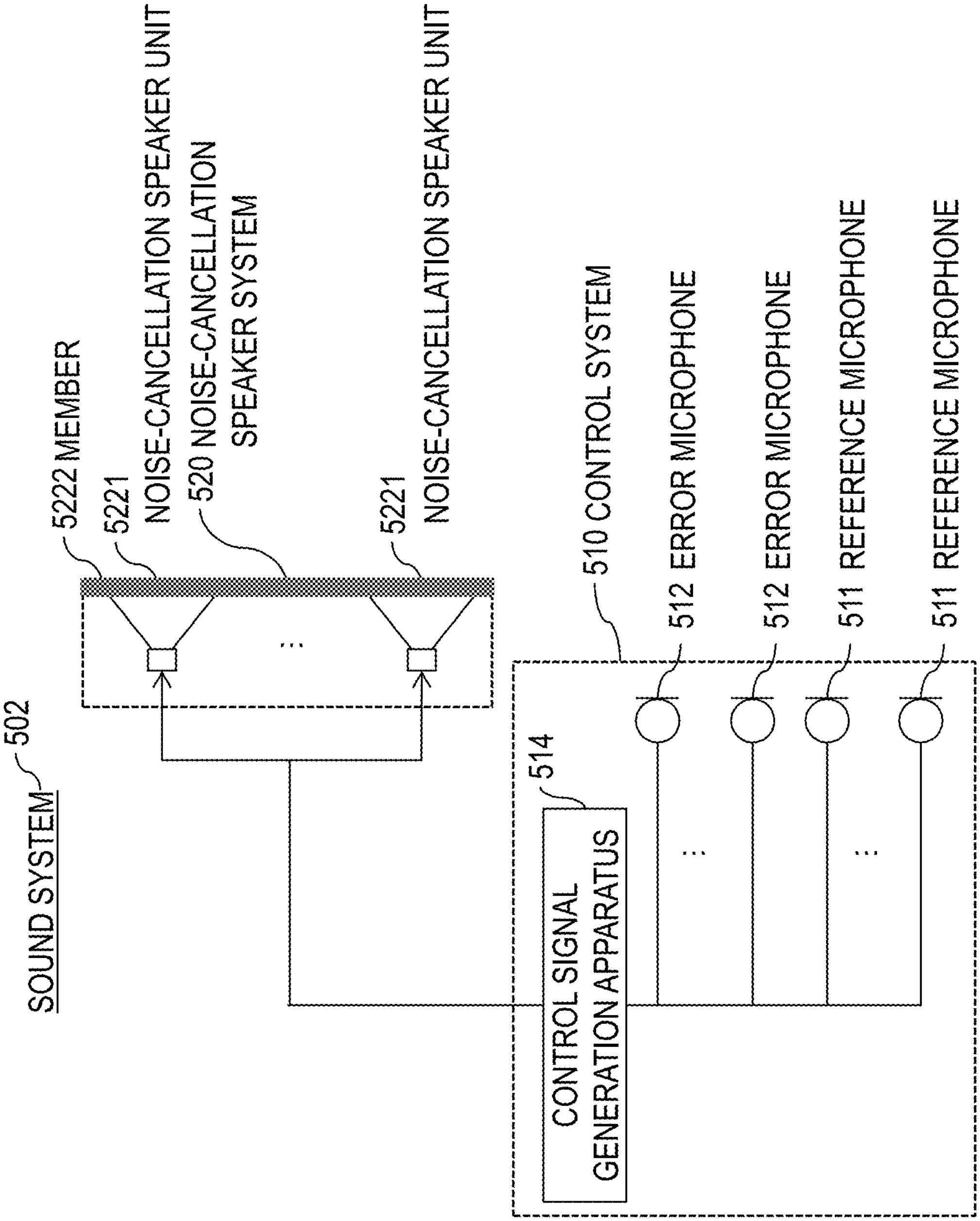
FIG. 7 is a block diagram showing an example of a configuration of a sound system 502.

Hereinafter, a sound system 502 will be described with reference to FIG. 7. FIG. 7 is a block diagram showing a configuration of the sound system 502. As shown in FIG. 7, the sound system 502 includes a control system 510 and a noise-cancellation speaker system 520, similarly to the sound system 501. However, the sound system 502 is different from the sound system 501 in a point that a member 5222 is attached to an m-th noise-cancellation speaker unit 5221 (m=1, . . . , M).

Hereinafter, a structure of the m-th noise-cancellation speaker unit 5221 (m=1, . . . , M) will be described, according to FIG. 7.

Figure 8:
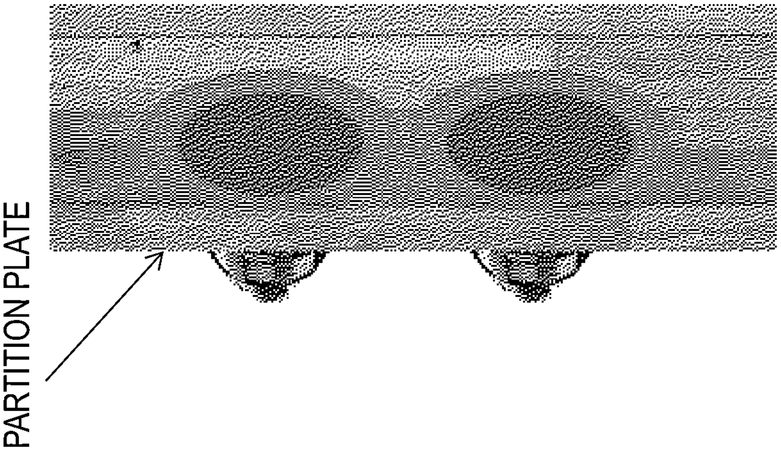
FIG. 8 shows an example of a configuration of a noise-cancellation speaker system 520 to which a member 5222 is attached.

The member 5222 is attached to the m-th noise-cancellation speaker unit 5221 (see FIG. 8). The member 5222 is for lengthening a path of sound bending around in the m-th noise-cancellation user direction, of sound emitted from the m-th noise-cancellation speaker unit 5221 in the opposite direction to the m-th noise-cancellation user direction. For example, the member 5222 may be a member such as a partition plate that prevents sound from bending around from the rear of the speaker unit. The member 5222 is attached in order to prevent interference of sound waves and to enlarge the area where noise is reduced.

The m-th noise-cancellation speaker unit 5221 to which the member 5222 is attached reduces noise in a larger area than the m-th noise-cancellation speaker unit 5221 in the second embodiment.

According to the embodiment of the present invention, it is possible to reduce noise heard when a user sits in a seat of an aircraft.

Fourth Embodiment

In the first to third embodiments, the description has been given of the sound systems (noise reduction sound systems) for reducing noise around a user using a seat of an aircraft. The noise reduction sound systems can be combined with a sound system (reproduction sound system) that reproduces sound based on a sound signal obtained from a subject to be reproduced such that the sound can be heard only by a user in the vicinity of a speaker system. Here, the subject to be reproduced is, for example, data or a signal from which the sound signal can be obtained through predetermined processing, such as data recorded on a CD, a DVD, or a record, data received over the Internet, or a signal received through radio broadcasting or television broadcasting.

Figure 9:
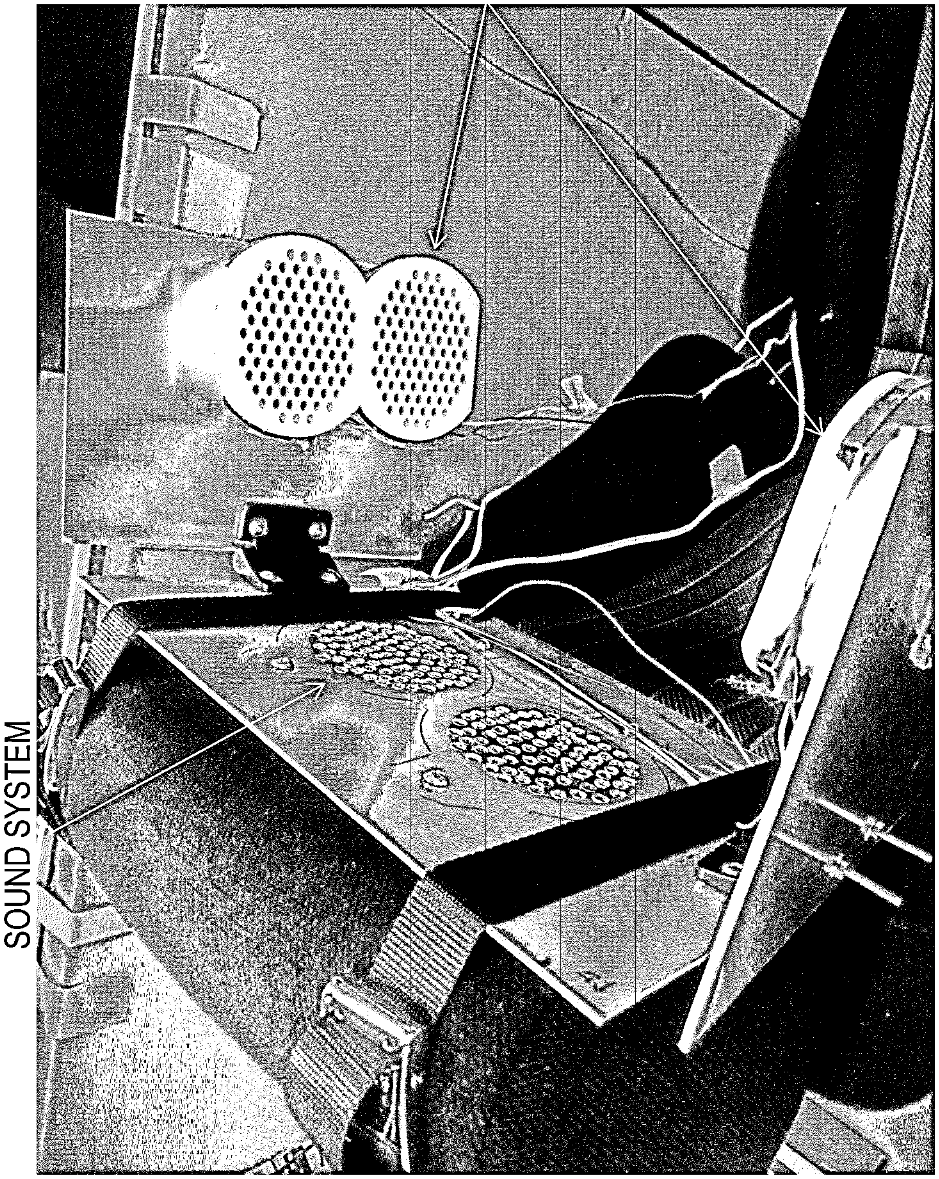
FIG. 9 shows an example of a sound system installed in a seat of an aircraft.

An example of a sound system configured by combining a noise reduction sound system and a reproduction sound system is shown in FIG. 9. FIG. 9 shows an example of the sound system installed in a seat of an aircraft. A speaker system of the reproduction sound system in FIG. 9 is installed in the seat so as to interpose a head of a user sitting in the seat in between, and is disposed such that speaker unit pairs are positioned in the vicinities of the right and left ears. On the other hand, a noise-cancellation speaker system of the noise reduction sound system is installed in the seat so as to be positioned at the back of the head of the user sitting in the seat. Note that the sound system can also be installed on vehicles other than aircrafts, such as automobiles and trains, and in reclining chairs and the like, and can also be installed in a wearable form to be put on a shoulder or the like. Moreover, similarly to the noise reduction sound system, the reproduction sound system may have a configuration in which a driver unit pair including two driver units arranged side by side, which corresponds to a pair of the above-described speaker units, is installed in each of right and left units of headphones or earphones. The headphones are broadly divided into open-air type and closed type in general, and when the above-described technique is applied particularly to the open-air type, sound leakage from which is a concern, a reduction in leaking sound can be expected.

Figure 10:
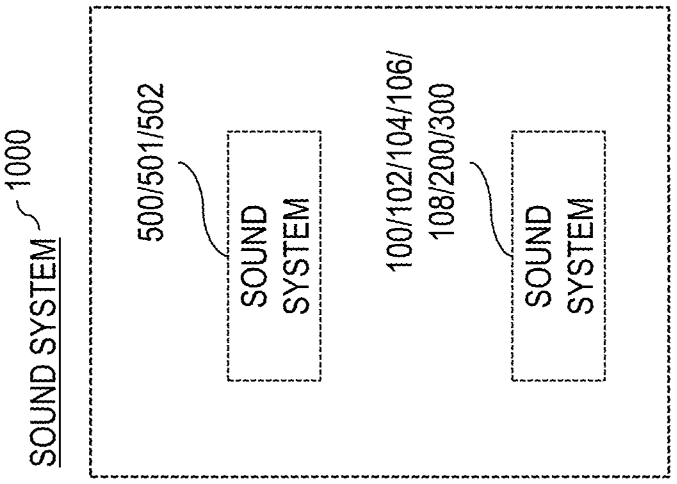
FIG. 10 is a block diagram showing an example of a configuration of a sound system 1000.

Hereinafter, a sound system 1000 will be described with reference to FIG. 10. FIG. 10 is a block diagram showing a configuration of the sound system 1000. The sound system 1000 includes a noise reduction sound system and a reproduction sound system. The noise reduction sound system can be the sound system 500, the sound system 501, or the sound system 502. On the other hand, the reproduction sound system can be a sound system 100, a sound system 102, a sound system 104, a sound system 106, a sound system 108, a sound system 200, or a sound system 300, which will be described below.

Hereinafter, each form of the reproduction sound system will be described.

<<Form 1: Sound System 100>>

Figure 11:
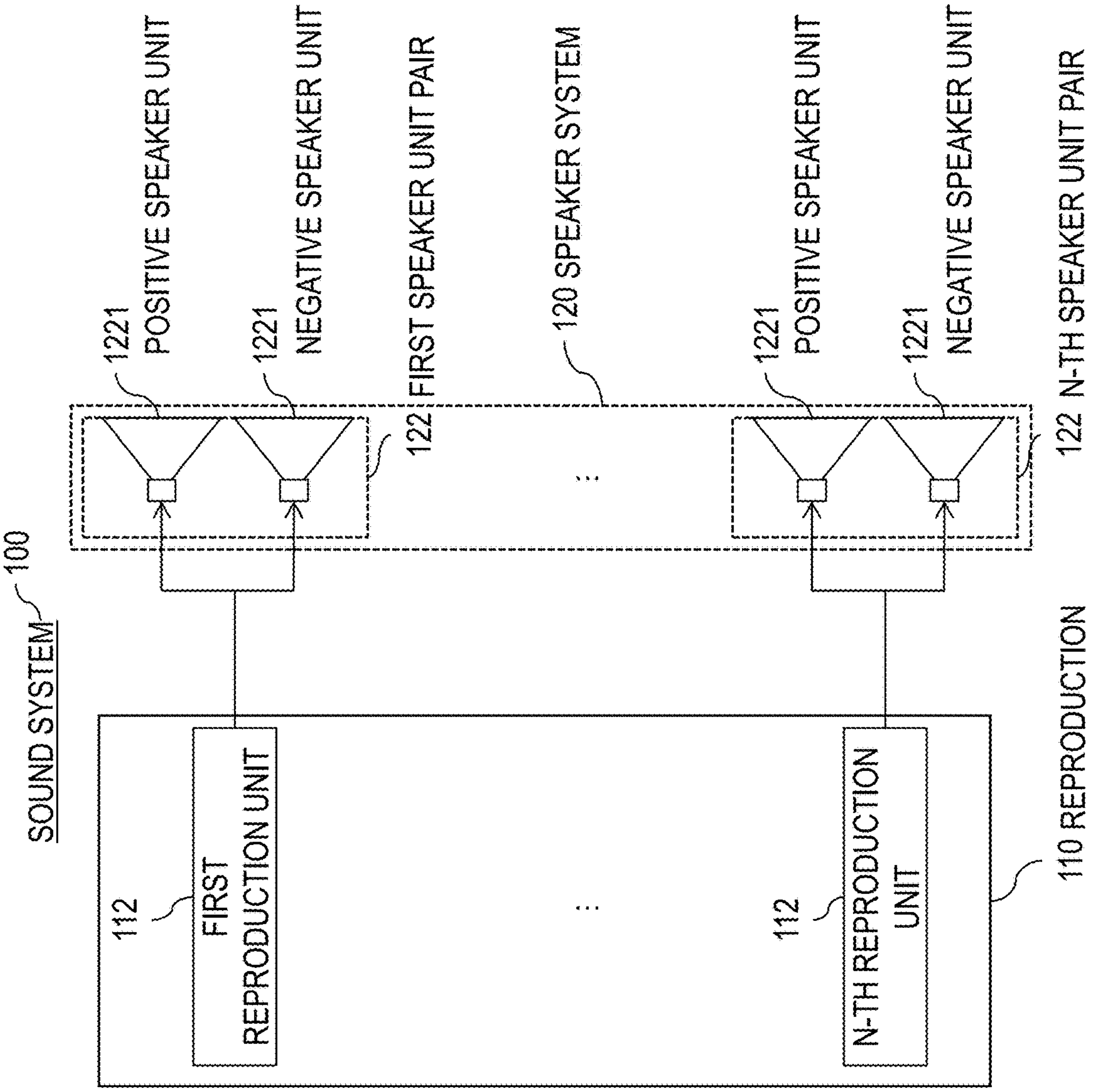
FIG. 11 is a block diagram showing an example of a configuration of a sound system 100.

Hereinafter, the sound system 100 will be described with reference to FIG. 11. FIG. 11 is a block diagram showing a configuration of the sound system 100. As shown in FIG. 11, the sound system 100 includes a reproduction apparatus 110 and a speaker system 120. The reproduction apparatus 110 includes N (N is an integer equal to or larger than one) reproduction units 112 (that is, a first reproduction unit 112, . . . , an N-th reproduction unit 112). The speaker system 120 includes N speaker unit pairs 122 (that is, a first speaker unit pair 122, . . . , an N-th speaker unit pair 122). Each speaker unit pair 122 includes two speaker units (that is, a positive speaker unit 1221 and a negative speaker unit 1221). The negative speaker unit 1221 receives, as an input, a sound signal with opposite phase to that of a sound signal inputted into the positive speaker unit 1221. The speaker system 120 is installed at a place close to a head of a user using the seat.

Note that a direction in which an n-th speaker unit pair 122 faces the user is referred to as an n-th user direction (n=1, . . . , N). The positive speaker unit 1221 and the negative speaker unit 1221 of the n-th speaker unit pair 122 (n=1, . . . , N) are disposed such that sound emitted from the positive speaker unit 1221 in an opposite direction to the n-th user direction and sound emitted from the negative speaker unit 1221 in the opposite direction to the n-th user direction propagate in the n-th user direction due to bending around of the sound. Here, the n-th user direction is a direction toward the front of the positive speaker unit 1221 and the negative speaker unit 1221 of the n-th speaker unit pair 122. The opposite direction to the n-th user direction is a direction toward the rear of the positive speaker unit 1221 and the negative speaker unit 1221 of the n-th speaker unit pair 122.

Moreover, the positive speaker unit 1221 and the negative speaker unit 1221 of the n-th speaker unit pair 122 (n=1, . . . , N) are disposed in a positional relationship in which sound emitted from the positive speaker unit 1221 and sound emitted from the negative speaker unit 1221 cancel each other out so that the sound cannot be heard by users using other seats.

Hereinafter, operation of the sound system 100 will be described, according to FIG. 11.

The reproduction apparatus 110 receives, as inputs, a first sound signal, a third sound signal, . . . , and a (2N−1)-th sound signal that are sound signals obtained based on a subject to be reproduced, and outputs the first sound signal, a second sound signal, . . . , and a 2N-th sound signal. More specifically, an n-th reproduction unit 112 (n=1, . . . , N) receives a (2n−1)-th sound signal as an input, generates, from the (2n−1)-th sound signal, a 2n-th sound signal that is a sound signal with opposite phase to that of the (2n−1)-th sound signal, and outputs the (2n−1)-th sound signal and the 2n-th sound signal. The (2n−1)-th sound signal and the 2n-th sound signal are inputted into the positive speaker unit 1221 and the negative speaker unit 1221 of the n-th speaker unit pair 122, respectively.

The speaker system 120 receives, as inputs, the first sound signal, the second sound signal, . . . , and the 2N-th sound signal outputted by the reproduction apparatus 110, and emits sound based on the first sound signal, sound based on the second sound signal, . . . , and sound based on the 2N-th sound signal. More specifically, the n-th speaker unit pair 122 (n=1, . . . , N) receives the (2n−1)-th sound signal and the 2n-th sound signal as inputs, and emits sound based on the (2n−1)-th sound signal from the positive speaker unit 1221, and emits sound based on the 2n-th sound signal from the negative speaker unit 1221. Since the (2n−1)-th sound signal and the 2n-th sound signal are in an antiphase relationship with each other, sound is heard only in the vicinity of the seat in which the speaker system 120 is installed. For example, when N=2, and assuming that the first sound signal and the third sound signal are sound signals from a right channel and a left channel of a sound source, respectively, stereo sound can be heard only in the vicinity of the seat in which the speaker system 120 is installed.

Note that the sound emitted from the positive speaker unit 1221 of the n-th speaker unit pair 122 in the n-th user direction and the sound emitted from the positive speaker unit 1221 of the n-th speaker unit pair 122 in the opposite direction to the n-th user direction are in an antiphase relationship. Similarly, the sound emitted from the negative speaker unit 1221 of the n-th speaker unit pair 122 in the n-th user direction and the sound emitted from the negative speaker unit 1221 of the n-th speaker unit pair 122 in the opposite direction to the n-th user direction are in an antiphase relationship.

<<Form 2: Sound System 102>>

The sound system 100 has a small so-called sweet spot, which is an area where emitted sound is heard. Here, a description will be given of a sound system having a structure that enlarges the sweet spot.

Figure 12:
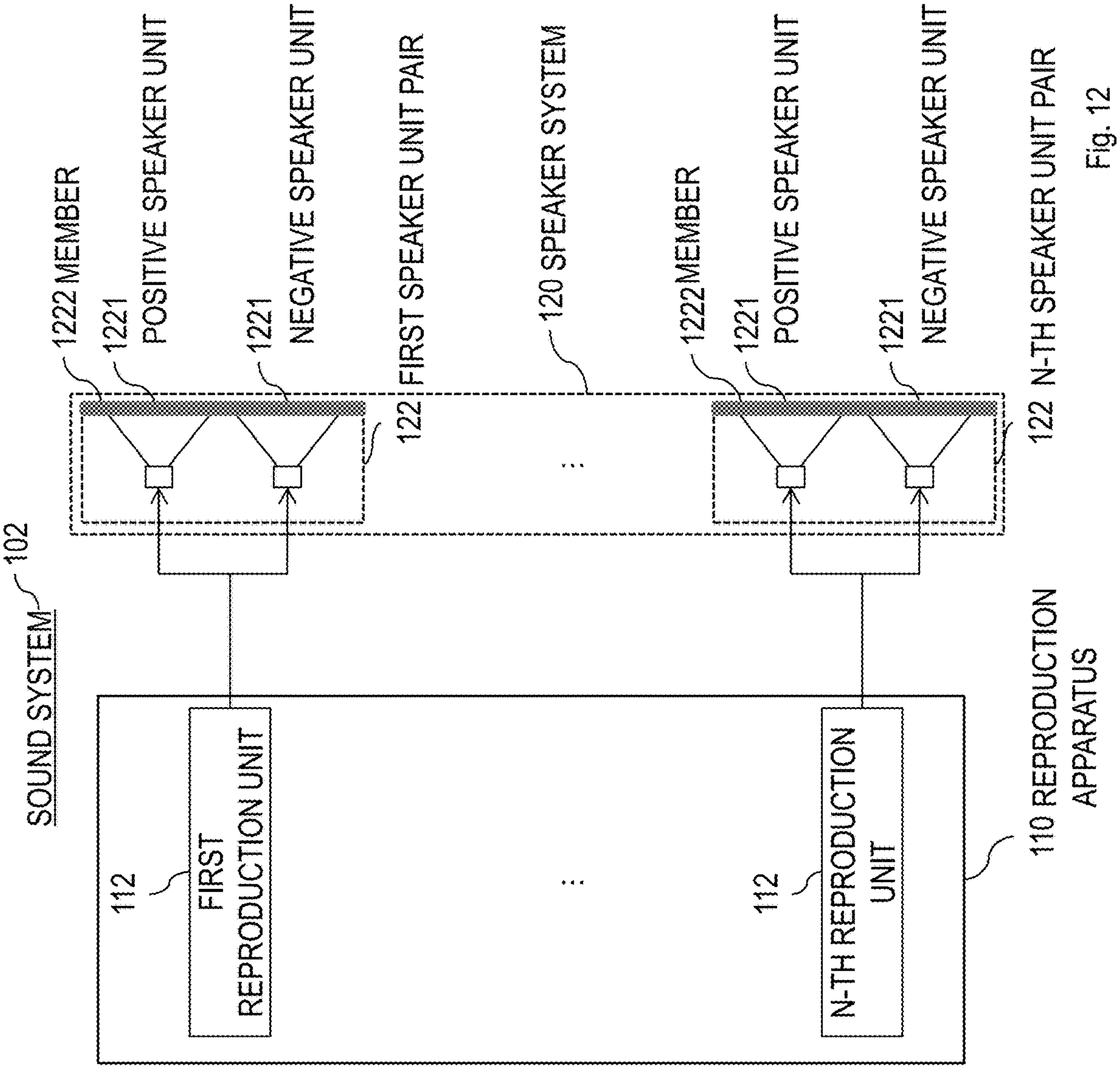
FIG. 12 is a block diagram showing an example of a configuration of a sound system 102.

Hereinafter, the sound system 102 will be described with reference to FIG. 12. FIG. 12 is a block diagram showing a configuration of the sound system 102. As shown in FIG. 12, the sound system 102 includes a reproduction apparatus 110 and a speaker system 120, similarly to the sound system 100. However, the sound system 102 is different from the sound system 100 in a point that a member 1222 is attached to each speaker unit pair 122.

Hereinafter, a structure of an n-th speaker unit pair 122 (n=1, . . . , N) will be described, according to FIG. 12.

Figure 13:
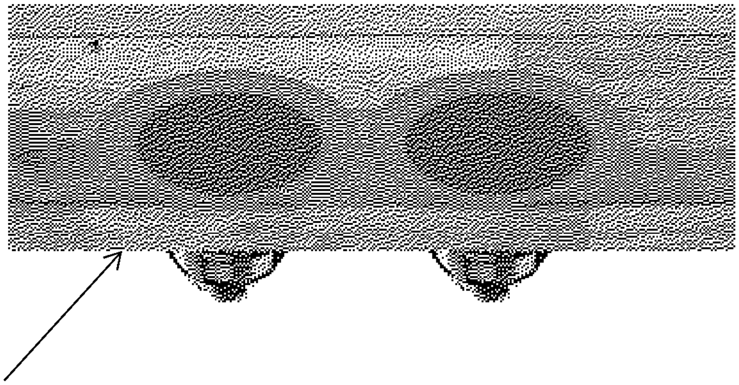
FIG. 13 shows an example of a configuration of a speaker unit pair 122 to which a member 1222 is attached.

The member 1222 is attached to the n-th speaker unit pair 122 (see FIG. 13). The member 1222 is for lengthening a path of sound bending around in the n-th user direction, of sound emitted from a positive speaker unit 1221 and a negative speaker unit 1221 of the n-th speaker unit pair 122 in an opposite direction to the n-th user direction. For example, the member 1222 may be a member such as a partition plate that prevents sound from bending around from the rear of the speaker units. The member 1222 is attached, not to prevent bending around of sound, but to make a phase difference larger between the sound bending around from the rear and sound from the front, that is, to lengthen the path of the sound bending around.

The n-th speaker unit pair 122 to which the member 1222 is attached has a larger sweet spot than the n-th speaker unit pair 122 in the form 1.

<<Form 3: Sound System 104>>

Since high-frequency sound has short wave lengths, phases of sound bending around from the rear and sound from the front do not easily coincide. Accordingly, high-frequency sound has a characteristic of being difficult to cancel, compared to low-frequency sound, in both the vicinity of a speaker unit and other relatively distant places. Since none of the positive speaker units 1221 and the negative speaker units 1221 of the speaker unit pairs 122 included in the sound system 100 are housed in speaker boxes, the area where high-frequency sound is heard is large due to the above-described characteristic, so that sound leakage may occur in some cases. Accordingly, here, a description will be given of a sound system having a structure that makes it difficult for high-frequency sound to leak into places other than the vicinity of a speaker system.

Figure 14:
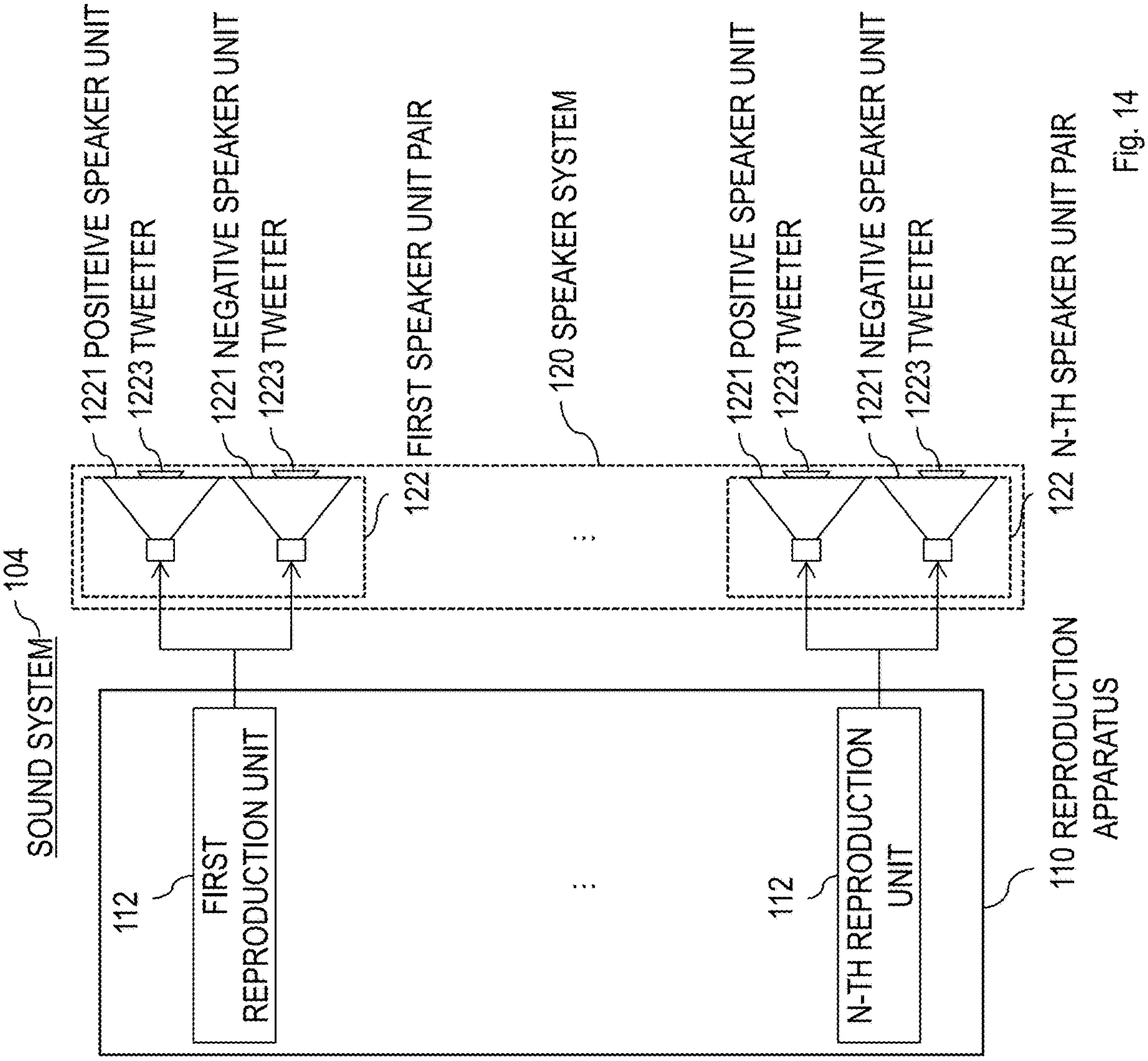
FIG. 14 is a block diagram showing an example of a configuration of a sound system 104.

Hereinafter, the sound system 104 will be described with reference to FIG. 14. FIG. 14 is a block diagram showing a configuration of the sound system 104. As shown in FIG. 14, the sound system 104 includes a reproduction apparatus 110 and a speaker system 120, similarly to the sound system 100. However, the sound system 104 is different from the sound system 100 in a point that a tweeter 1223 is added to each of a positive speaker unit 1221 and a negative speaker unit 1221 of each speaker unit pair 122. Here, the tweeter is a speaker unit for reproducing a signal at high frequencies. Note that the tweeters 1223 are assumed to be added to the positive speaker units 1221 and the negative speaker units 1221 in such a manner that sound from the rear does not leak, as if the tweeters 1223 were housed in speaker boxes.

Hereinafter, operation of the speaker system 120 will be described, according to FIG. 14.

The speaker system 120 receives, as inputs, a first sound signal, a second sound signal, . . . , and a 2N-th sound signal outputted by the reproduction apparatus 110, and emits sound based on the first sound signal, sound based on the second sound signal, . . . , and sound based on the 2N-th sound signal. More specifically, an n-th speaker unit pair 122 (n=1, . . . , N) receives a (2n−1)-th sound signal and a 2n-th sound signal as inputs, and emits sound based on the (2n−1)-th sound signal from the positive speaker unit 1221 and the tweeter 1223 added to the positive speaker unit 1221, and emits sound based on the 2n-th sound signal from the negative speaker unit 1221 and the tweeter 1223 added to the negative speaker unit 1221.

Although higher-frequency sound has higher straightness by nature, a form is made such that sound from the rear of the tweeters 1223 does not leak, and it is therefore possible to prevent high-frequency sound emitted from the tweeters 1223 from leaking in all directions.

<<Form 4: Sound System 200>>

The tweeter is a speaker unit for reproducing a signal at high frequencies. A configuration may be made therefore such that only signals at high frequencies are inputted into tweeters through band division processing. Accordingly, here, a description will be given of a sound system that performs band division processing.

Figure 15:
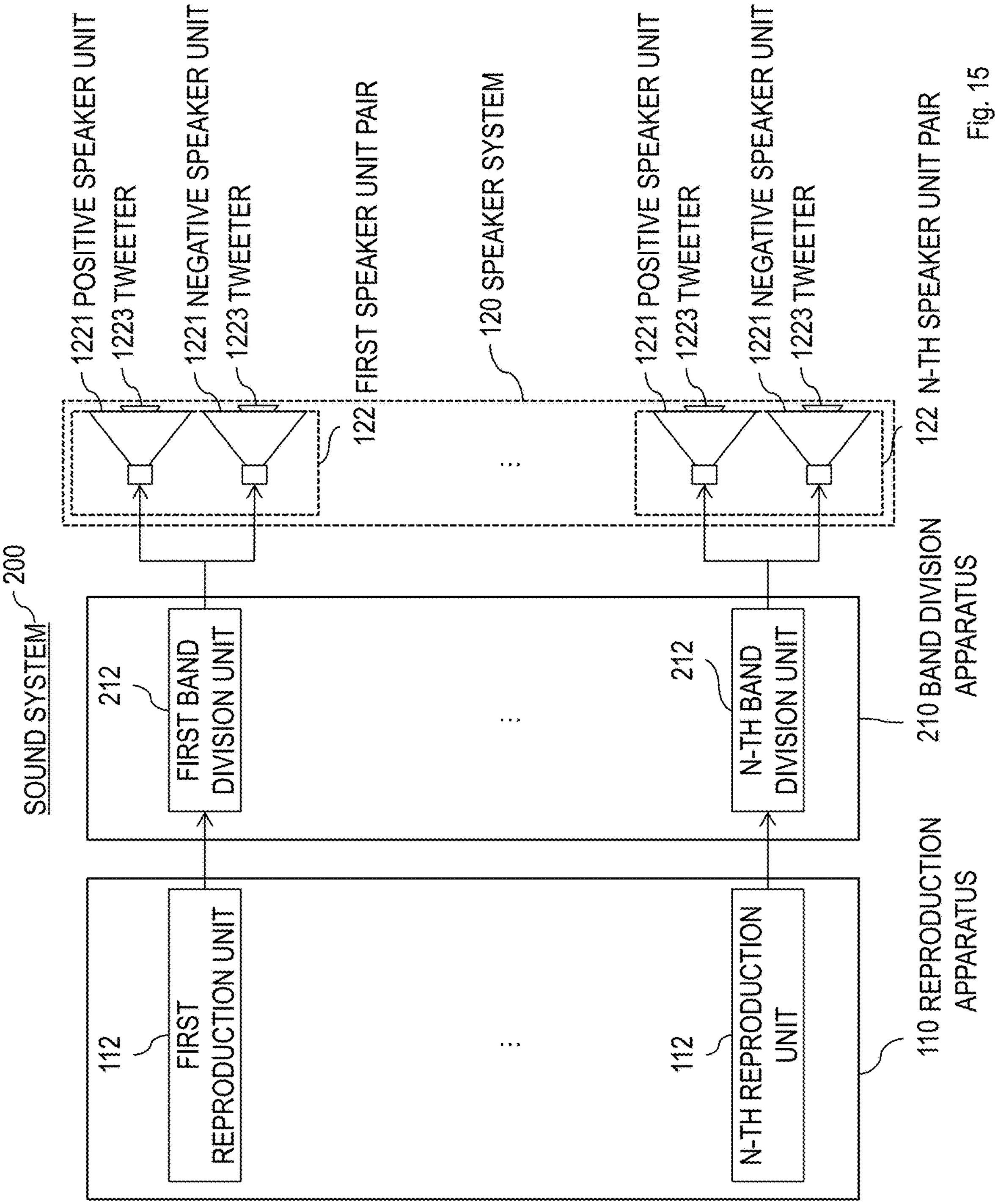
FIG. 15 is a block diagram showing an example of a configuration of a sound system 200.

Hereinafter, the sound system 200 will be described with reference to FIG. 15. FIG. 15 is a block diagram showing a configuration of the sound system 200. As shown in FIG. 15, the sound system 200 includes a reproduction apparatus 110, a band division apparatus 210, and a speaker system 120.

The band division apparatus 210 includes N band division units 212 (that is, a first band division unit 212, . . . , an N-th band division unit 212). The sound system 200 is different from the sound system 104 in a point that the band division apparatus 210 is included.

Hereinafter, operation of the band division apparatus 210 and the speaker system 120 will be described, according to FIG. 15.

The band division apparatus 210 receives, as inputs, a first sound signal, a second sound signal, . . . , and a 2N-th sound signal outputted by the reproduction apparatus 110, and outputs a first high-frequency signal and a first low-frequency signal that are a signal at high frequencies and a signal at low frequencies of the first sound signal, respectively, a second high-frequency signal and a second low-frequency signal that are a signal at high frequencies and a signal at low frequencies of the second sound signal, respectively, . . . , and a 2N-th high-frequency signal and a 2N-th low-frequency signal that are a signal at high frequencies and a signal at low frequencies of the 2N-th sound signal. More specifically, an n-th band division unit 212 (n=1, . . . , N) receives a (2n−1)-th sound signal and a 2n-th sound signal as inputs, generates a (2n−1)-th high-frequency signal and a (2n−1)-th low-frequency signal that are a signal at high frequencies and a signal at low frequencies of the (2n−1)-th sound signal, respectively, generates a 2n-th high-frequency signal and a 2n-th low-frequency signal that are a signal at high frequencies and a signal at low frequencies of the 2n-th sound signal, respectively, and outputs the (2n−1)-th high-frequency signal, the (2n−1)-th low-frequency signal, the 2n-th high-frequency signal, and the 2n-th low-frequency signal.

The speaker system 120 receives, as inputs, the first high-frequency signal, the first low-frequency signal, the second high-frequency signal, the second low-frequency signal, . . . , the 2N-th high-frequency signal, and the 2N-th low-frequency signal outputted by the band division apparatus 210, and emits sound based on the first high-frequency signal, sound based on the first low-frequency signal, sound based on the second high-frequency signal, sound based on the second low-frequency signal, . . . , sound based on the 2N-th high-frequency signal, and sound based on the 2N-th low-frequency signal. More specifically, an n-th speaker unit pair 122 (n=1, . . . , N) receives the (2n−1)-th high-frequency signal, the (2n−1)-th low-frequency signal, the 2n-th high-frequency signal, and the 2n-th low-frequency signal as inputs, and emits sound based on the (2n−1)-th low-frequency signal and sound based on the (2n−1)-th high-frequency signal from the positive speaker unit 1221 and the tweeter 1223 added to the positive speaker unit 1221, respectively, and emits sound based on the 2n-th low-frequency signal and sound based on the 2n-th high-frequency signal from the negative speaker unit 1221 and the tweeter 1223 added to the negative speaker unit 1221, respectively.

<<Form 5: Sound System 300>>

In the sound system 200, speaker units to each of which the tweeter 1223 is added are used for the positive speaker unit 1221 and the negative speaker unit 1221. Here, a description will be given of a sound system that uses speaker unit pairs each including two speaker units and one tweeter, instead of the speaker unit pairs each including two speaker units to which tweeters are added, respectively.

Figure 16:
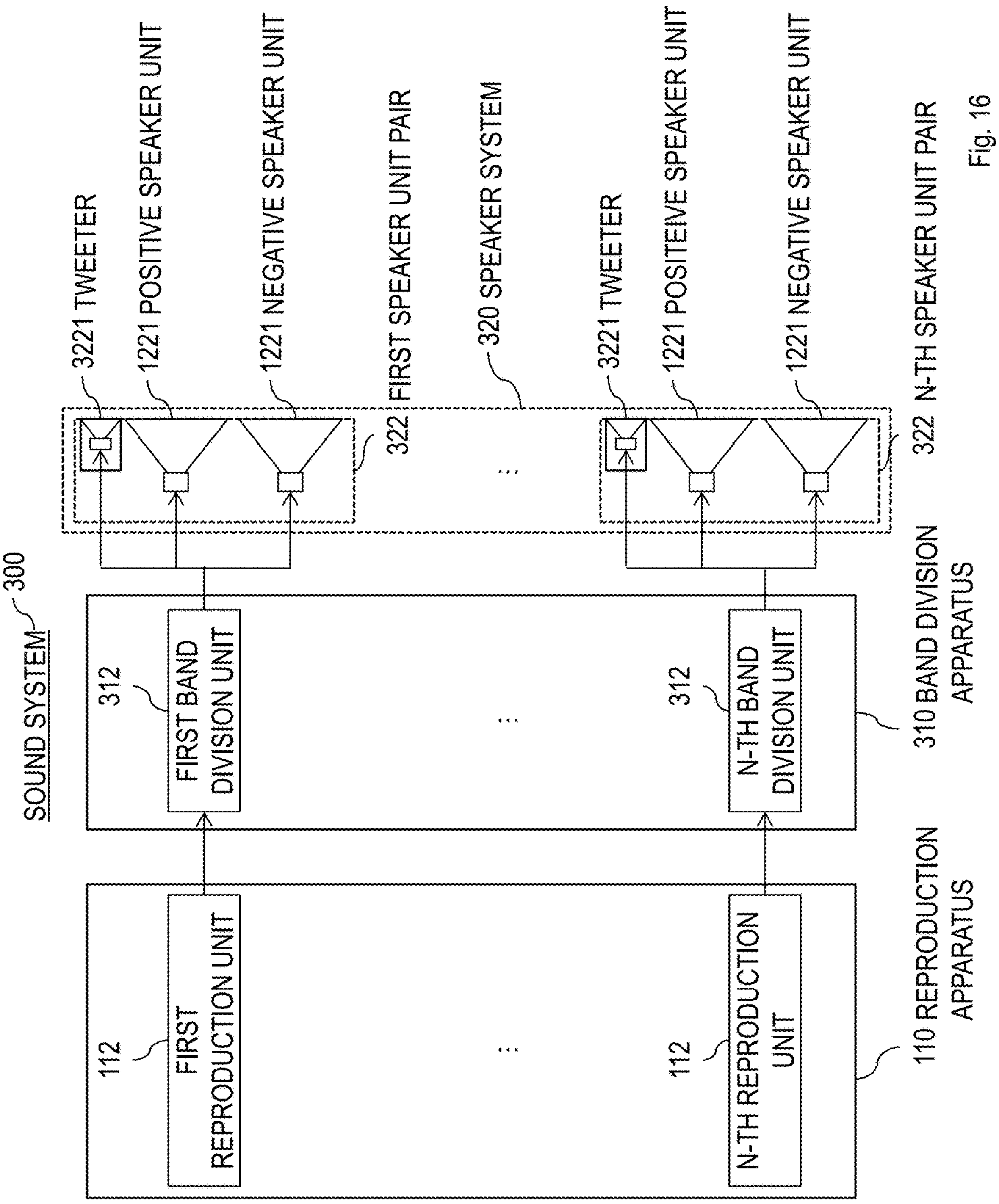
FIG. 16 is a block diagram showing an example of a configuration of a sound system 300.

Hereinafter, the sound system 300 will be described with reference to FIG. 16. FIG. 16 is a block diagram showing a configuration of the sound system 300. As shown in FIG. 16, the sound system 300 includes a reproduction apparatus 110, a band division apparatus 310, and a speaker system 320. The band division apparatus 310 includes N band division units 312 (that is, a first band division unit 312, . . . , an N-th band division unit 312). The speaker system 320 includes N speaker unit pairs 322 (that is, a first speaker unit pair 322, . . . , an N-th speaker unit pair 322). Each speaker unit pair 322 includes two speaker units (that is, a positive speaker unit 1221 and a negative speaker unit 1221) and a tweeter 3221. The sound system 300 is different from the sound system 200 in a point that the band division apparatus 310 and the speaker system 320 are included instead of the band division apparatus 210 and the speaker system 120.

It is preferable that each tweeter 3221 be housed in a speaker box such that sound from the rear does not leak. Moreover, the speaker system 320 is installed at a place close to a head of a user using the seat.

Note that a direction in which an n-th speaker unit pair 322 faces the user is referred to as an n-th user direction (n=1, . . . , N). The positive speaker unit 1221 and the negative speaker unit 1221 of the n-th speaker unit pair 322 (n=1, . . . , N) are disposed such that sound emitted from the positive speaker unit 1221 in an opposite direction to the n-th user direction and sound emitted from the negative speaker unit 1221 in the opposite direction to the n-th user direction propagate in the n-th user direction due to bending around of the sound. Here, the n-th user direction is a direction toward the front of the positive speaker unit 1221, the negative speaker unit 1221, and the tweeter 3221 of the n-th speaker unit pair 322. The opposite direction to the n-th user direction is a direction toward the rear of the positive speaker unit 1221, the negative speaker unit 1221, and the tweeter 3221 of the n-th speaker unit pair 322.

Moreover, the positive speaker unit 1221 and the negative speaker unit 1221 of the n-th speaker unit pair 322 (n=1, . . . , N) are disposed in a positional relationship in which sound emitted from the positive speaker unit 1221 and sound emitted from the negative speaker unit 1221 cancel each other out so that the sound is not heard by users using other seats.

Hereinafter, operation of the band division apparatus 310 and the speaker system 320 will be described, according to FIG. 16.

The band division apparatus 310 receives, as inputs, a first sound signal, a second sound signal, . . . , and a 2N-th sound signal outputted by the reproduction apparatus 110, and outputs a first high-frequency signal and a first low-frequency signal that are a signal at high frequencies and a signal at low frequencies of the first sound signal, respectively, a second low-frequency signal that is a signal at low frequencies of the second sound signal, . . . , a (2N−1)-th high-frequency signal and a (2N−1)-th low-frequency signal that are a signal at high frequencies and a signal at low frequencies of the (2N−1)-th sound signal, respectively, and a 2N-th low-frequency signal that is a signal at low frequencies of the 2N-th sound signal. More specifically, an n-th band division unit 312 (n=1, . . . , N) receives a (2n−1)-th sound signal and a 2n-th sound signal as inputs, generates a (2n−1)-th high-frequency signal and a (2n−1)-th low-frequency signal that are a signal at high frequencies and a signal at low frequencies of the (2n−1)-th sound signal, respectively, generates a 2n-th low-frequency signal that is a signal at low frequencies of the 2n-th sound signal, and outputs the (2n−1)-th high-frequency signal, the (2n−1)-th low-frequency signal, and the 2n-th low-frequency signal.

The speaker system 320 receives, as inputs, the first high-frequency signal, the first low-frequency signal, the second low-frequency signal, . . . , the (2N−1)-th high-frequency signal, the (2N−1)-th low-frequency signal, and the 2N-th low-frequency signal outputted by the band division apparatus 310, and emits sound based on the first high-frequency signal, sound based on the first low-frequency signal, sound based on the second low-frequency signal, . . . , sound based on the (2N−1)-th high-frequency signal, sound based on the (2N−1)-th low-frequency signal, and sound based on the 2N-th low-frequency signal. More specifically, the n-th speaker unit pair 322 (n=1, . . . , N) receives the (2n−1)-th high-frequency signal, the (2n−1)-th low-frequency signal, and the 2n-th low-frequency signal as inputs, and emits sound based on the (2n−1)-th high-frequency signal from the tweeter 3221, emits sound based on the (2n−1)-th low-frequency signal from the positive speaker unit 1221, and emits sound based on the 2n-th low-frequency signal from the negative speaker unit 1221.

<<Form 6: Sound System 106>>

The sound system 104 is a system that makes it difficult for high-frequency sound to leak by using the speaker units 1221 to which the tweeters 1223 are added, respectively. Here, a description will be given of a sound system that makes it difficult for high-frequency sound to leak by using a member having a sound absorption characteristic, instead of using the speaker units to which the tweeters are added.

Figure 17:
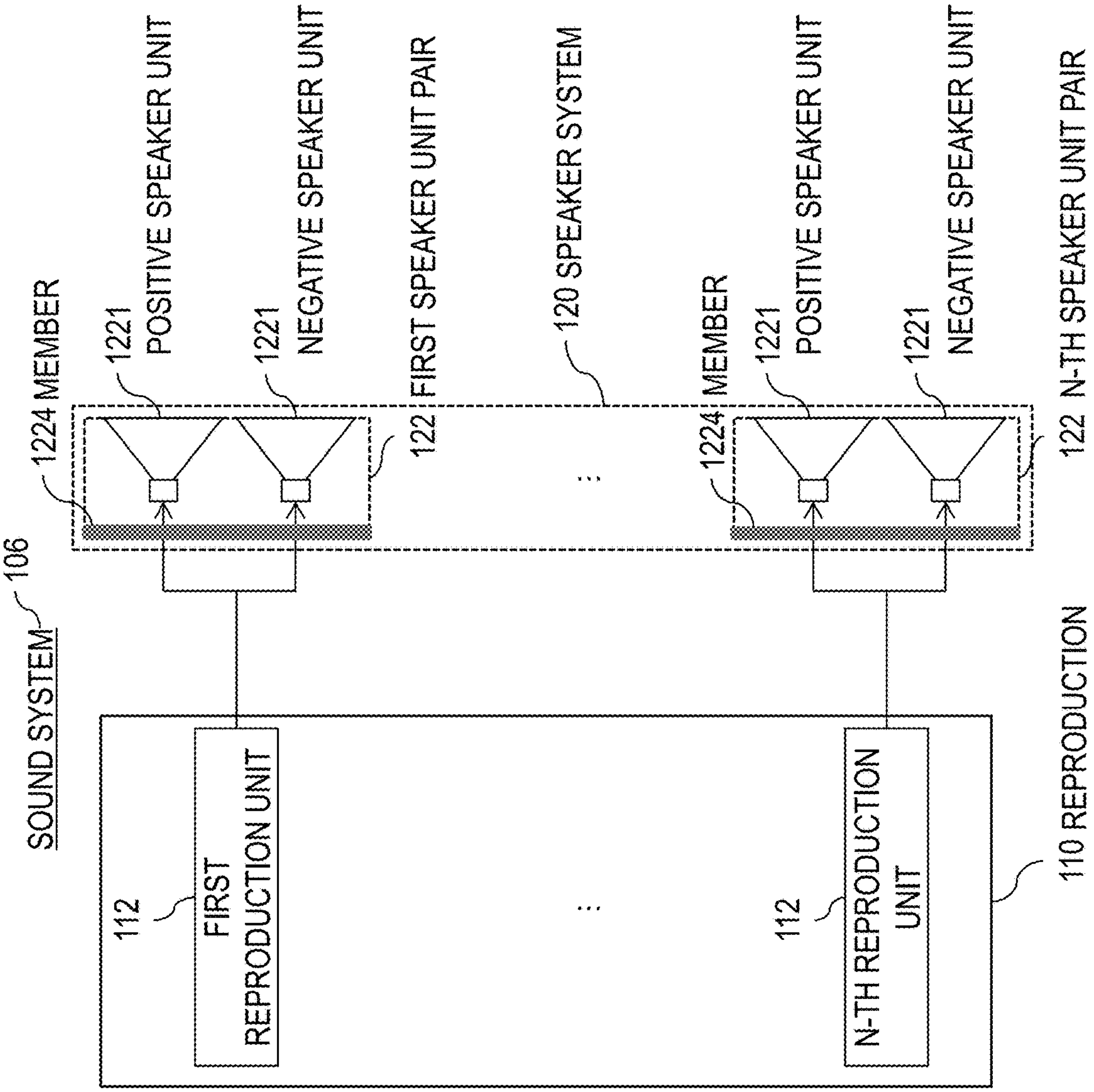
FIG. 17 is a block diagram showing an example of a configuration of a sound system 106.

Hereinafter, the sound system 106 will be described with reference to FIG. 17. FIG. 17 is a block diagram showing a configuration of the sound system 106. As shown in FIG. 17, the sound system 106 includes a reproduction apparatus 110 and a speaker system 120, similarly to the sound system 104. However, the sound system 106 is different from the sound system 104 in points that speaker units 1221 to which no tweeters 1223 are added are used instead of the speaker units 1221 to which the tweeters 1223 are added, and that a member 1224 is attached to each speaker unit pair 122.

Hereinafter, a structure of an n-th speaker unit pair 122 (n=1, . . . , N) will be described, according to FIG. 17.

Figure 18:
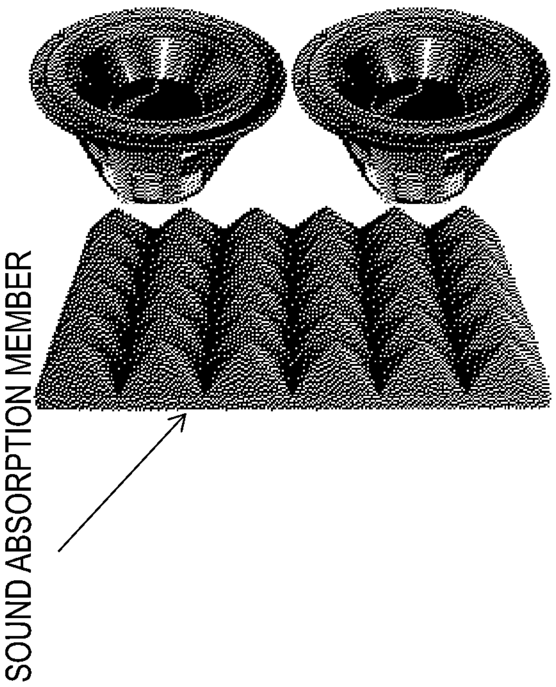
FIG. 18 shows an example of a configuration of the speaker unit pair 122 to which a member 1224 is attached.

The member 1224 is attached to the n-th speaker unit pair 122 (see FIG. 18). The member 1224 is for absorbing sound emitted from a positive speaker unit 1221 and a negative speaker unit 1221 of the n-th speaker unit pair 122 in an opposite direction to an n-th user direction. The member 1224 may be any member that can prevent high-frequency sound from being emitted on the rear. Note that the member 1224 may be installed so as to enclose the speaker unit pair 122 except a front face, instead of being installed only on a rear face of the speaker unit pair 122.

<<Form 7: Sound System 108>>

The sound system 106 is a system that makes it difficult for high-frequency sound to leak by using the speaker units 1221 to which the members 1224 are attached. Here, a description will be given of a sound system that makes it difficult for high-frequency sound to leak by housing each speaker unit of each speaker unit pair in a perforated speaker box, instead of using the speaker unit pairs to which the sound absorption members are attached.

Figure 19:
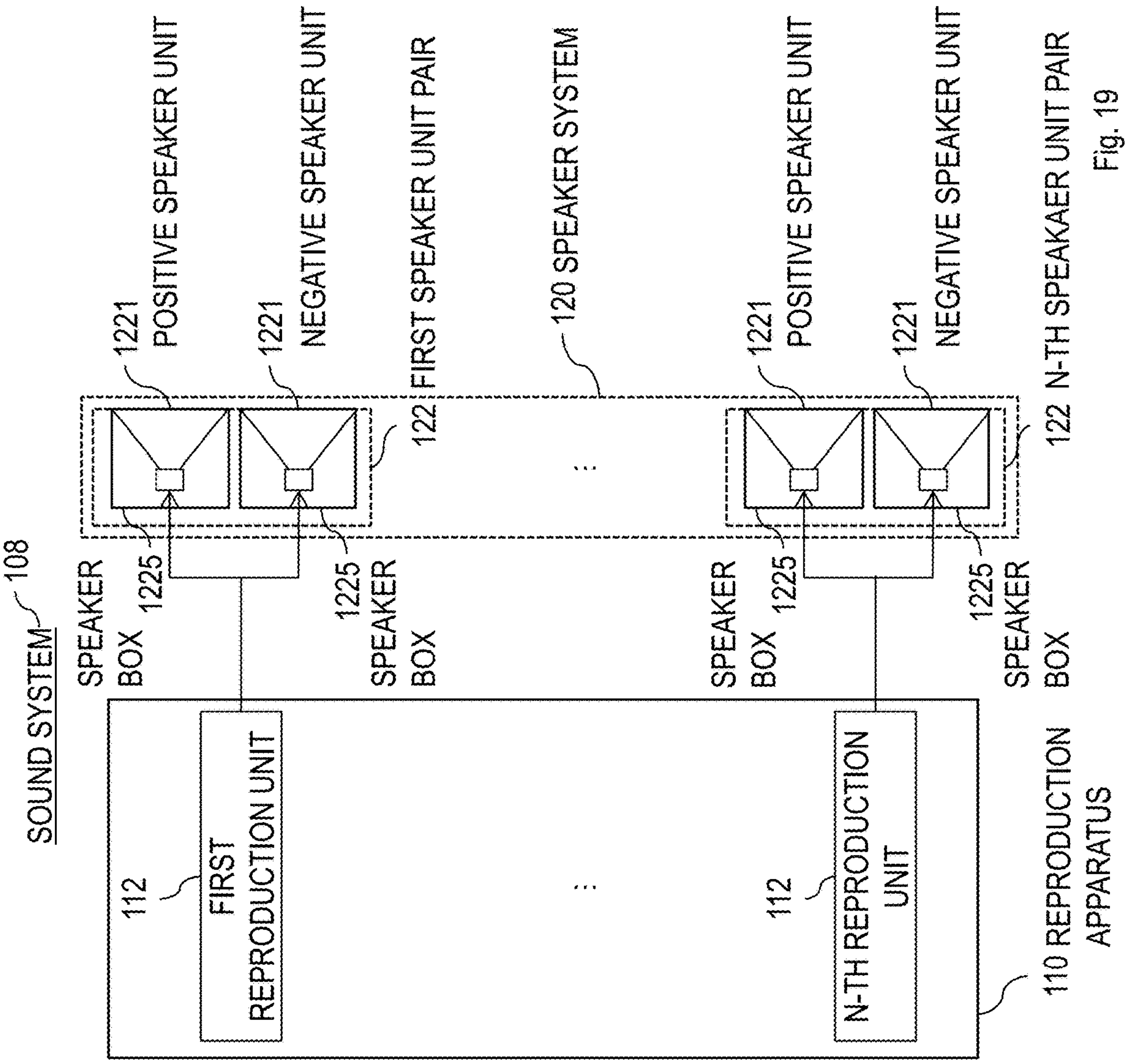
FIG. 19 is a block diagram showing an example of a configuration of a sound system 108.

Hereinafter, the sound system 108 will be described with reference to FIG. 19. FIG. 19 is a block diagram showing a configuration of the sound system 108. As shown in FIG. 19, the sound system 108 includes a reproduction apparatus 110 and a speaker system 120, similarly to the sound system 106. The sound system 108 is different from the sound system 106 in a point that speaker unit pairs 122 each including speaker units 1221 each housed in a speaker box 1225 are included, instead of the speaker unit pairs 122 to which the members 1224 are attached.

Hereinafter, a structure of an n-th speaker unit pair 122 (n=1, . . . , N) will be described, according to FIG. 19.

A positive speaker unit 1221 and a negative speaker unit 1221 of the n-th speaker unit pair 122 are housed in the speaker boxes 1225, respectively. Note that each speaker box 1225 is perforated with many holes.

According to the embodiment of the present invention, it is possible to reduce noise heard when a user sits in a seat of an aircraft. At the same time, it is possible to reproduce sound that can be heard only in a very limited small area, that is, the vicinity of a speaker system.

<Supplement>

The above description of the embodiments of the present invention is provided for illustrative and descriptive purposes. The embodiments are not intended to be exhaustive, or to limit the invention to the exact forms disclosed. Modifications and variations can be made from the above-described teachings. The embodiments are selectively presented in order to provide the best illustrations of the principle of the present invention, and to allow persons skilled in the art to use the present invention in various embodiments, or with addition of various modifications, so that the invention can be adapted to contemplated actual uses. All of such modifications and variations are within the scope of the present invention specified by the accompanying claims that are interpreted according to a justifiably, legitimately, and fairly given range.

The invention claimed is:

1. A sound system comprising:

a control system that generates a control signal for canceling noise in a place close to a head of a user using a seat of an aircraft, from a signal of the noise (hereinafter, referred to as the noise signal); and a noise-cancellation speaker system including M speaker units that emit sound based on the control signal (hereinafter, referred to as the noise-cancellation speaker units), M being an integer equal to or larger than one, the noise-cancellation speaker system being installed at the place close to the head of the user using the seat, wherein assuming that the M noise-cancellation speaker units are a first noise-cancellation speaker unit, . . . , and an M-th noise-cancellation speaker unit, and assuming that a direction in which the m-th noise-cancellation speaker unit faces the user is an m-th noise-cancellation user direction (m=1, . . . , M), the m-th noise-cancellation speaker unit (m=1, . . . , M) is disposed such that sound emitted from the m-th noise-cancellation speaker unit in the m-th noise-cancellation user direction is canceled in a place other than the place close to the head of the user using the seat, due to bending around of sound emitted from the m-th noise-cancellation speaker unit in an opposite direction to the m-th noise-cancellation user direction, wherein a member is attached to the m-th noise-cancellation speaker unit (m=1, . . . , M), the member being for lengthening a path of the sound bending around in the m-th noise-cancellation user direction, of the sound emitted from the m-th noise-cancellation speaker unit in the opposite direction to the m-th noise-cancellation user direction.

2. The sound system according to claim 1, further comprising:

a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one; and a speaker system including an n-th speaker unit pair (n=1, . . . , N) including a speaker unit that emits sound based on the (2n−1)-th sound signal (hereinafter, referred to as the positive speaker unit) and a speaker unit that emits sound based on the 2n-th sound signal (hereinafter, referred to as the negative speaker unit), the speaker system being installed at the place close to the head of the user using the seat.

3. The sound system according to claim 2, wherein the positive speaker unit and the negative speaker unit of the n-th speaker unit pair (n=1, . . . , N) are disposed in a positional relationship in which the sound emitted from the positive speaker unit and the sound emitted from the negative speaker unit cancel each other out so that the sound is not heard by another user using a seat other than the seat.

4. The sound system according to claim 2, wherein assuming that a direction in which the n-th speaker unit pair faces the user is an n-th user direction (n=1, . . . , N), the positive speaker unit and the negative speaker unit of the n-th speaker unit pair (n=1, . . . , N) are disposed such that sound emitted from the positive speaker unit in an opposite direction to the n-th user direction and sound emitted from the negative speaker unit in the opposite direction to the n-th user direction propagate in the n-th user direction due to bending around of the sound.

* * * * *